United States Patent [19]

Fontana et al.

[11] Patent Number: 4,983,706

[45] Date of Patent: Jan. 8, 1991

[54] INTERFACIAL PROCESS COMPRISING REACTING A DIHYDRIC PHENOL, A CARBONATE PRECURSOR AND AN ALIPHATIC ALPHA OMEGA DICARBOXYLIC SALT

[75] Inventors: Luca P. Fontana, Evansville; Paul W. Buckley, Mt. Vernon; Denise Y. Harris, Evansville, all of Ind.; Eugene P. Boden, Scotia, N.Y.

[73] Assignee: General Electric Company, Mt. Vernon, Ind.

[21] Appl. No.: 476,066

[22] Filed: Jan. 30, 1990

[51] Int. Cl.⁵ .................. C08G 8/02; C08G 63/02; C08G 63/62

[52] U.S. Cl. ................................. 528/176; 528/179; 528/193; 528/196; 528/198

[58] Field of Search ............... 528/125, 171, 176, 185, 528/193, 196

[56] References Cited

U.S. PATENT DOCUMENTS 3,169,121 2/1965 Goldberg .......................... 528/193
4,131,575 12/1978 Adelmann et al. ................ 528/196
4,238,596 12/1980 Quinn ................................ 528/179
4,238,597 12/1980 Markezich et al. ............... 528/179
4,628,081 12/1986 Mark et al. ....................... 528/196
4,677,183 6/1987 Mark et al. ....................... 528/196

Primary Examiner—Harold D. Anderson
Assistant Examiner—T. Mosley
Attorney, Agent, or Firm—Martin B. Barancik

[57] ABSTRACT

A process which comprises reacting interfacially a dihydric phenol, a carbonate precursor and a prior prepared salt of an aliphatic alpha omega dicarboxylic acid having from 8 to about 20 carbon atoms thereby producing a copolyestercarbonate.

10 Claims, No Drawings

INTERFACIAL PROCESS COMPRISING REACTING A DIHYDRIC PHENOL, A CARBONATE PRECURSOR AND AN ALIPHATIC ALPHA OMEGA DICARBOXYLIC SALT

BACKGROUND OF THE INVENTION

Polycarbonates are well known as a tough, clear, highly impact resistant thermoplastic resin. However the polycarbonates are also possessed of a relatively high melt viscosity. Therefore in order to prepare a molded article from polycarbonate, relatively high extrusion and molding temperatures are required. Various efforts throughout the years to reduce the melt viscosity while also maintaining the desired physical properties of the polycarbonates have been attempted. These methods include the use of plasticizers, the use of aliphatic chain stoppers, reduction of molecular weight, the preparation of bisphenols having long chain aliphatic substituents and various polycarbonate copolymers as well as blends of polycarbonate with other polymers.

With respect to plasticizers, these are generally used with thermoplastics to achieve higher melt flow. However usually accompanying the plasticizer incorporation into polycarbonate compositions are undesirable features such as embrittlement and fugitive characteristics of the plasticizer.

Increased flow can be fairly readily obtained with the use of aliphatic chain stoppers, however impact resistance as measured by notched izod drops significantly. Embrittlement may also be a problem.

When utilizing a bisphenol having a lengthy aliphatic chain thereon, increases in flow can be observed. However these are usually accompanied by substantial decreases in the desirable property of impact strength.

Various processes have been utilized to prepare polycarbonates with increased process ability. When utilizing a copolyestercarbonate with an aliphatic segment, processes such as the pyridine solvent process of U.S. Pat. No. 3,169,121, have been utilized as well as processes utilizing diacid halides in an interfacial process sequence such as disclosed in U.S. Pat. No. 4,238,596 and U.S. Pat. No. 4,238,597. Additionally, high molecular weight aliphatic segments have been introduced into the polycarbonate (by interfacial methods) utilizing dicarboxylic endcapped polyisobutylene segments, see Mark and Peters U.S. Pat. No. 4,677,183 and U.S. Pat. No. 4,628,081. Additionally a method of incorporating aliphatic dicarboxylic acids into polycarbonate is disclosed in Kochanowski, U.S. Pat. No. 4,280,683 wherein in an interfacial process the diacids are reacted together with a dihydric phenol and a carbonate precursor such as phosgene.

As disclosed in the companion case filed on the same day and designated as 8CL-6888, the incorporation of aliphatic alpha omega medium chain acids of from eight to twenty carbon atoms produced copolyestercarbonates of sharply increased process ability as measured by melt flow together with a property spectrum which was at least substantially similar to the usual aromatic polycarbonate. Therefore great interest has been generated in successfully synthesizing the copolyestercarbonate with the aliphatic ester segment. Although a standard interfacial process utilizing the chloride derivative of the saturated aliphatic alpha omega diacids can be employed to prepare the copolyestercarbonate the availability of the diacid chloride starting materials is a problem. Aliphatic diacid chlorides are commercially available only in limited quantities and at a very high cost. Furthermore even high purity diacid chlorides contain color contaminants which cause the final molded parts to display an unattractively high yellowness index. Therefore attention was focused on the readily available, relatively inexpensive diacid starting materials. The previously mentioned Kochanowski patent was studied. The disclosure is directed to the usage of various aliphatic dibasic acids as disclosed at column 5, lines 13 through 22 in combination with a dihydric phenol and a carbonate precursor such as phosgene in an interfacial process. According to Kochanowski at column 6, lines 24 to 31, the reaction was carried out at a pH of between about 4.5 and 8, preferably between about 5.5 and 6.5 until the dibasic acid is consumed. The pH of the reaction is then raised to a value of between 9 and 11.5 to complete the reaction. The polyestercarbonate is isolated according to standard techniques, see column 6, lines 24 through 30 of Kochanowski. Experiments which followed the Kochanowski disclosure were conducted. 50% of adipic acid present as a 10 mole % reactant was incorporated within the polycarbonate backbone therefore providing a 5 mole % copolyestercarbonate. Additionally it has been discovered that the preferred pH range disclosed in Kochanowski does not bring about complete incorporation of diacids into copolyestercarbonates in a reasonable time period. The procedure of Example 6, see column 9, lines 1 to 13 of Kochanowski, discloses the preparation of an azelate containing bisphenol-A copolyestercarbonate. The azelaic acid reactant was present at 25 mole percent of the bisphenol-A. The most incorporation of azelate observed was 18 mole% following the procedure of Example 6. It is therefore clear that in many situations, the dibasic acid cannot be consumed in a practical sense. The raising of the pH therefore should not occur according to the Kochanowski disclosure. It should also be noted that Kochanowski uses a very high excess of phosgene.

A new process has been discovered which can bring about complete incorporation of aliphatic alpha omega diacids into aromatic polycarbonate backbones thereby producing a copolyestercarbonate having a predictable quantity of ester.

Even when there is essentially no detectable unreacted dicarboxylic acid, the reaction time is significantly shortened compared with Kochanowski or the earlier process disclosed in Ser. No. 455,067 (067), filed Dec. 22, 1989. Still further, the stepwise pH range is not significant compared with either Kochanowski or 067.

SUMMARY OF THE INVENTION

In accordance with the invention there is a process which comprises reacting interfacially a dihydric phenol, a carbonate precursor and a prior prepared salt of an aliphatic alpha omega dicarboxylic acid having from 8 to about 20 carbon atoms.

DETAILED DESCRIPTION OF THE INVENTION

The copolyestercarbonates of this invention are prepared utilizing the standard dihydric phenol and carbonate precursor. The usual dihydric phenols useful in preparation of aromatic polycarbonates are also available here. Examples of these dihydric phenols are:

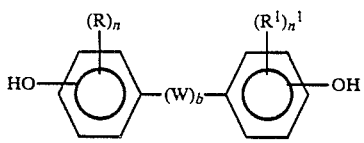

wherein
- R is independently selected from halogen, monovalent hydrocarbon, and monovalent hydrocarbonoxy radicals;
- $R^1$ is independently selected from halogen, monovalent hydrocarbon, and monovalent hydrocarbonoxy radicals;
- W is selected from divalent hydrocarbon radicals,

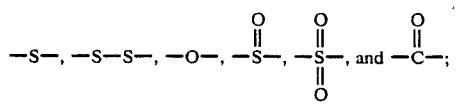

n and $n^1$ are independently selected from integers having a value of from 0 to 4 inclusive; and
b is either zero or one.

The monovalent hydrocarbon radicals represented by R and $R^1$ include the alkyl, cycloalkyl, aryl, aralkyl and alkaryl radicals. The preferred alkyl radicals are those containing from 1 to about 12 carbon atoms. The preferred cycloalkyl radicals are those containing from 4 to about 8 ring carbon atoms. The preferred aryl radicals are those containing from 6 to 12 ring carbon atoms, i.e., phenyl, naphthyl, and biphenyl. The preferred alkaryl and aralkyl radicals are those containing from 7 to about 14 carbon atoms.

The preferred halogen radicals represented by R and $R^1$ are chlorine and bromine.

The divalent hydrocarbon radicals represented by W include the alkylene, alkylidene, cycloalkylene and cycloalkylidene radicals. The preferred alkylene radicals are those containing from 2 to about 30 carbon atoms. The preferred alkylidene radicals are those containing from 1 to about 30 carbon atoms. The preferred cycloalkylene and cycloalkylidene radicals are those containing from 6 to about 16 ring carbon atoms.

The monovalent hydrocarbonoxy radicals represented by R and $R^1$ may be represented by the formula —$OR^2$ wherein $R^2$ is a monovalent hydrocarbon radical of the type described hereinafore. Preferred monovalent hydrocarbonoxy radicals are the alkoxy and aryloxy radicals.

Some illustrative non-limiting examples of the dihydric phenols falling within the scope of the Formula include:
2,2-bis(4-hydroxyphenyl)propane (bisphenol-A);
2,2-bis(3,5-dibromo-4-hydroxyphenyl)propane;
2,2-bis(3,5-dimethyl-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)decane;
1,4-bis(4-hydroxyphenyl)propane;
1,1-bis(4-hydroxyphenyl)cyclododecane;
1,1-bis(3,5-dimethyl-4-hydroxyphenyl)cyclododecane;
4,4-dihydroxydiphenyl ether;
4,4-thiodiphenol;
4,4-dihydroxy-3,3-dichlorodiphenyl ether; and
4,4-dihydroxy-2,5-dihydroxydiphenyl ether.

Other useful dihydric phenols which are also suitable for use in the preparation of the above polycarbonates are disclosed in U.S. Pat. Nos. 2,999,835; 3,028,365; 3,334,154; and 4,131,575, all of which are incorporated herein by reference.

The carbonate precursor utilized in the invention can be any of the standard carbonate precursors used in interfacial reaction such as phosgene, and the like. When using the interfacial process it is also standard practice to use a catalyst system well known in the synthesis of polycarbonates and copolyestercarbonates. A typical catalyst system is that of an amine system such as tertiaryamine, amidine or guanidine. Tertiaryamines are generally employed in such reactions. Trialkylmines such as triethylamine are generally preferred.

A chain terminating agent to control the molecular weight of the polymer is usually present. Generally a monofunctional agent such as a carboxylic or phenol is used. Phenols are preferred. Example of such phenols include phenol, paratertiary butyl phenol, isoctylphenol, isononyl phenol, chromanyl compounds such as Chroman I and cumyl compounds such as paracumyl phenol. Quantities of chain terminating agents can range from about 0.5 to about 7 mole percent based on the dihydric phenol.

The monomer which supplies the aliphatic ester units in the copolyestercarbonate is an aliphatic alpha omega dicarboxylic acid from 8 to about 20 carbon atoms, preferably 9 or 10 carbon atoms. The aliphatic system is normal, branched or cyclic. Examples of the system reactants include sebacic acid, dodecanedioic acid and various branched alkylene groupings. The normal aliphatic alpha omega dicarboxylic acids are preferred, generally from 9 to about 14 carbon atoms, inclusive. Saturated diacids are preferred. Dodecanedioic acid and sebacic acid are most preferred. Although the process can be performed with any quantity of the diacid salt, it is preferred to have the diacid salt present in from about 2 to 30 mole percent of the dihydric phenol reactant, more preferably 5 to about 25 mole percent, still more preferably 7 to about 15 mole percent.

The salts of these acids are readily prepared by contacting the diacid generally in its solid form with an aqueous alkaline solution prepared from water and various bases prepared from alkali or alkaline earth hydroxides such as sodium hydroxide, potassium hydroxide, calcium hydroxide, barium hydroxide and the like. Sodium hydroxide is preferred thereby preparing the sodium salt of the dicarboxylic acid. It is also preferred to have the same salt cation as is used in the aqueous solution in the interfacial reaction. For example, if sodium hydroxide is the aqueous pH controlling phase in the interfacial reaction, it is preferred to prepare and react the sodium dicarboxylate.

Amine catalyst with a range of about 0.75 to about 3.0 mole percent based on the dihydric phenol content can be employed in the interfacial reaction.

The process is simply carried out by standard techniques well known in the art. For example, aqueous sodium hydroxide is charged to the reactor with the particular dihydric phenol being employed, preferably bisphenol-A. The chain terminating agent can be added now or later. The reactor can already have the organic solvent, preferably methylene chloride, or it can be added at this time. Also present can be the chain terminating agent. All the reactants and solutions can be present and the solution of the dicarboxylate salt then added. Following these various options of addition, the carbonate precursor, preferably phosgene, is then added. The pH is maintained at an alkaline level, generally at or above about pH8. Toward the end of the carbonate precursor addition period the pH is raised preferably to about 10 or higher, generally from about 10 to 12. Although essentially all of the diacid can be incorporated if the entire reaction is conducted at higher pH, for example at or about 10.0 or higher, it is preferable to run at least the initial stages of the carbonate precursor addition at the lower pH, about 8.0 to 8.5 and then raising to the higher pH for the final period of carbonate precursor addition. Therefore anywhere from about 0 to about 95% of the carbonate precursor addition time can be run at about pH8 to 8.5 with the remainder of the carbonate precursor addition time at a pH of about 10 to 12. Preferably the initial period of carbonate precursor addition, about pH 8 to 8.5, is from about 5 to 85% of the total time.

The inventive process has the surprising advantage of reducing reaction times substantially, that is by ⅓ or more over the same reaction utilizing diacid added to the reactor.

Below are non inventive preparations and comparative examples as well as the examples of the invention. The invention examples are not intended to narrow the general scope of the invention.

NON INVENTION PREPARATIONS

A. At a pH of 10 to 11 throughout the phosgenation, interfacial reactions of bisphenol-A, phosgene and various dicarboxylic acids per se of differing carbon chain length were attempted. The pH was controlled with sodium hydroxide. The organic phase was methylene chloride. These reactions resulted in little or no incorporation of the diacids as shown by NMR. The diacids attempted to be incorporated within the polycarbonate backbone included suberic, azelaic, sebacic, and dodecanedioic. The phosgenation time period ranged from 20 to 40 minutes.

B1. A 2000 mL five neck Morton flask equipped with a bottom outlet was fitted with a mechanical stirrer, a pH probe, an aqueous sodium hydroxide (50%) inlet tube, a Claisen adapter to which a dry ice condenser was attached, and a gas inlet tube. The flask was charged with bisphenol A (71 g, 311 mmol), triethylamine (0.9 mL), p-cumylphenol (2.0 g, 9 mmol), methylene chloride (220 mL), and dodecanedioic acid. Then phosgene was introduced at a rate of 2 g/min, while the pH was maintained at 8 by addition of caustic for 17 minutes. The pH was then raised and maintained at around 10.5 while phosgene addition continued for 3 additional minutes. The total amount of phosgene added was 40 g (400 mmol). The pH was adjusted to 11-11.5 and the organic phase was separated from the brine layer, washed with 2% hydrochloric acid, and with deionized water.

The brine layer was acidified to pH 1 with concentrated HCl. Unreacted diacid was precipitated. Gravimetric analysis demonstrated that 10% of the diacid charged to the reactor was not incorporated into the polymer.

B2 Following the procedure of B1 but altering the reaction times in the step-wise pH sequence to 26 minutes at pH8 and 5 minutes at pH of about 10.5 the copolyestercarbonate was prepared. After acidification of the washes to pH1 no unreacted dodecanedioic acid precipitated. This shows 100% incorporation of the diacid during the total 31 minute phosgenation period.

EXAMPLES

The disodium salt of dodecanedioic acid (DDDA) was generated by dissolving the free acid (7.2 g, 31 mmol) and NaOH pellets (2.7 g, 68 mmol) in water (180 mL).

A 2000 mL five neck Morton flask equipped with a bottom outlet was fitted with a mechanical stirrer, a pH probe, an aqueous sodium hydroxide (50%) inlet tube, a Claisen adapter to which a dry ice condenser was attached, and a gas inlet tube. The flask was charged with bisphenol A (71 g, 311 mmol), triethylamine (0.9 mL), p-cumylphenol (2.0 g, 9 mmol), methylene chloride (220 mL), and the disodium salt solution of DDDA described above. Then phosgene was introduced at a rate of 2 g/min while the pH was maintained at 8 by addition of caustic for 10 minutes. The pH was then raised and maintained at around 10.5 while phosgene addition continued for 10 additional minutes. The total amount of phosgene added was 40 g (400 mmol). The pH was adjusted to 11-11.5 and the organic phase was separated from the brine layer, washed with 2% hydrochloric acid, (3×300 mL), and with deionized water (5×300 mL).

The brine layer was acidified to pH 1 with concentrated HCl and no unreacted DDDA precipitated.

The methylene chloride solution was dried (MgSO$_4$), filtered, and then precipitated into methanol (1500 mL). The resin was washed with methanol (1×500 mL) and deionized water (4×500 mL), and dried at 110° C. for 15 hours.

The same process was repeated, but the pH step was performed at different time intervals. The results are described in the table below.

TABLE I

| Example | Total Reaction Time (min) | Time at pH 8 (min) | Time at pH 10.5 (min) | % Unreacted DDDA |
|---|---|---|---|---|
| 1 | 20 | 10 | 10 | 0 |
| 2 | 20 | 5 | 15 | 0 |
| 3 | 20 | 0 | 20 | 1 |

As can be seen from the above results and the non-invention comparative examples, there are significant advantages in the inventive process. Merely using the diacid at the single pH level of 10–11 brings about little or no incorporation of the diacid into the polycarbonate backbone. However when the disodium salt of DDDA is charged to the reactor, all but 1% of the DDDA is incorporated into the polycarbonate during the 20 minute phosgenation period at pH 10.5, thus providing the copolyestercarbonate.

Following the pH step sequence and utilizing the DDDA per se it was observed that a 20 minute phosgenation period only incorporated 90% of the DDDA. 10% was unincorporated. Rather, a 31 minute phosgenation period was required to incorporate all the DDDA when the diacid was charged as itself to the reactor. This is in direct contrast to the invention process. When the disodium salt of the DDDA was charged to the reactor as an aqueous solution, it required only 20 minutes phosgenation time to bring about complete incorporation. Furthermore this was accomplished with very flexible pH time periods. The advantages of the inventive process are clear.

What is claimed is:

1. A process which comprises reacting interfacially a dihydric phenol, a carbonate precursor and a prior prepared salt of an aliphatic alpha omega dicarboxylic acid having from 8 to about 20 carbon atoms thereby producing a copolyestercarbonate.

2. The process in accordance with claim 1 wherein at least about 99% of the diacid is incorporated with the copolyestercarbonate.

3. The process in accordance with claim 1 wherein essentially all of the diacid is incorporated into the copolyestercarbonate.

4. The process in accordance with claim 2 wherein the dihydric phenol is bisphenol-A.

5. The process in accordance with claim 2 wherein the carbonate precursor is phosgene.

6. The process in accordance with claim 2 wherein the process is carried out at pH above or equal to about 10.

7. The process in accordance with claim 2 wherein 0 to 95% of the carbonate precursor addition time is carried out at a pH of from about 8 to 8.5 with the remainder of the carbonate precursor addition time at a pH of about 10 to 12.

8. The process in accordance with claim 2 wherein the salt is an alkali metal salt.

9. The process in accordance with claim 8 wherein the salt is sodium.

10. The process in accordance with claim 2 wherein the salt of the dicarboxylic acid is from about 2 to about 30 mole percent of the dihydric phenol reactant.

* * * * *